(12) United States Patent
Tsubaki

(10) Patent No.: US 9,609,355 B2
(45) Date of Patent: Mar. 28, 2017

(54) IMAGE PROCESSING APPARATUS TO WHICH MOVING VECTOR SEARCH TECHNIQUE IS APPLICABLE, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Hidetoshi Tsubaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/831,534

(22) Filed: Aug. 20, 2015

(65) Prior Publication Data

US 2016/0057445 A1 Feb. 25, 2016

(30) Foreign Application Priority Data

Aug. 22, 2014 (JP) .................................. 2014-169385

(51) Int. Cl.
*G06K 9/36* (2006.01)
*H04N 19/513* (2014.01)
(Continued)

(52) U.S. Cl.
CPC ........... *H04N 19/521* (2014.11); *G06T 7/204* (2013.01); *H04N 5/23254* (2013.01);
(Continued)

(58) Field of Classification Search
CPC ............... H04N 19/521; H04N 19/527; H04N 5/23251; H04N 5/23264; H04N 5/23248;
(Continued)

(56) References Cited

U.S. PATENT DOCUMENTS 7,929,043 B2 * 4/2011 Tsubaki .................... G06T 7/20
348/208.6
8,497,916 B2 * 7/2013 Ogura ................ H04N 5/23267
348/208.13

(Continued)

FOREIGN PATENT DOCUMENTS

JP 08-275049 A 10/1996
JP 2009-049457 A 3/2009

*Primary Examiner* — Kanjibhai Patel
(74) *Attorney, Agent, or Firm* — Cowan, Liebowitz & Latman, P.C.

(57) ABSTRACT

An image processing apparatus that is capable of improving image stabilization performance by improving motion vector search performance by restricting a search range even for an image with a large motion due to a camera shake of an image pickup apparatus at a tele-end side of a zoom lens or a shoot while walking at a wide-end side. A motion vector search unit searches for a motion vector of a reference image later input from an image pickup device with respect to a standard image input previously. A control unit sets at least one of a search range and a search position of a motion vector searched by the motion vector search unit based on position-posture change information about the image pickup apparatus detected by a detection unit and image stabilization control information obtained from an image stabilizing unit.

10 Claims, 11 Drawing Sheets

(51) Int. Cl.
*H04N 5/232* (2006.01)
*G06T 7/20* (2017.01)
*H04N 19/57* (2014.01)

(52) U.S. Cl.
CPC ..... *H04N 5/23258* (2013.01); *H04N 5/23267* (2013.01); *H04N 5/23287* (2013.01); *H04N 19/57* (2014.11)

(58) Field of Classification Search
CPC .... H04N 5/23254; H04N 5/144; H04N 5/145; H04N 5/23258; H04N 5/23261; H04N 5/23267; H04N 5/23287; G06T 2207/10016; G06T 7/20; G06T 2207/10024; G06T 2207/20024; G06T 2207/20201; G06T 5/006; G06T 7/204
USPC .................................. 382/236, 275
See application file for complete search history.

(56) References Cited

U.S. PATENT DOCUMENTS

| | | | |
|---|---|---|---|
| 8,749,644 B2 * | 6/2014 | Lee ............ | G06T 7/20 348/208.4 |
| 8,797,414 B2 * | 8/2014 | Park ............ | H04N 5/145 348/208.3 |
| 8,818,046 B2 * | 8/2014 | Kurata ............ | H04N 5/145 375/240 |

* cited by examiner

SEARCH POSSIBILITY RATE

SEARCH POSSIBILITY RATE

OUTLIER

ACCURACY

IMAGE PROCESSING APPARATUS TO WHICH MOVING VECTOR SEARCH TECHNIQUE IS APPLICABLE, CONTROL METHOD THEREFOR, AND STORAGE MEDIUM STORING CONTROL PROGRAM THEREFOR

BACKGROUND OF THE INVENTION

Field of the Invention

The present invention relates to an image processing apparatus to which a search technique for searching corresponding points or a motion vector between moving image frames is applied, a control method therefor, and a storage medium storing a control program therefor.

Description of the Related Art

Image processing apparatuses employed in image pickup apparatuses in recent years require advancement of vector search performance (a search possibility rate, annon-outlier rate, and accuracy) because the number of pixels increases and performance is improved. The search possibility rate indicates a ratio of possibility that only one peak is obtained on a correlation value map. The non-outlier rate is a ratio in which a motion vector that is output by template matching (TM) as a correct result is not incorrect greatly. The accuracy is a parameter about slight deviation of the motion vector from a true motion vector that is not as large as the outlier.

On the other hand, the TM holds an important position in searching corresponding points or a motion vector between moving image frames and in tracking a locus of a feature point (hereinafter referred to as a "motion vector"). Motion vector information obtained by the TM is utilized as input information required for applications of an image pickup apparatus like multi-image compositions including image stabilization, a multi-image noise reduction (NR), and a dynamic range expansion (HDR).

In a design of a motion vector search unit by the TM, a search range, a template size, and a determining threshold are main fundamental-planning values that influence performance.

The search range is determined on the basis of a moving amount of an image to be searched between frames.

The template size is determined so as to keep the search possibility rate high and to keep the outlier rate low. In order to simultaneously keep performance and robustness, for example, in order to correspond to a large camera shake, it is necessary to search a wide search range. In order to determine the only one peak within the wide search range, a large template size is required so that a wide area may be caught without being influenced by a repeated pattern, a flat part, etc.

However, when the template size is enlarged in order to correspond to a wide search range, accuracy tends to deteriorate. The reason why is because when a partial area other than a remarkable point deforms and moves with respect to the remarkable point in the template and the partial area includes a remarkable feature, the accuracy of the motion vector search deteriorates due to influence of the relative movement. Specifically, the accuracy deteriorates due to competition of parallax owing to an arrangement of objects, deformation caused in a moving body, distortion of an optical system, or an effect of rolling shutter distortion of an image pickup device. Naturally, the accuracy tends to deteriorate due to the above-mentioned deformation or distortion as the template size becomes larger.

A determining threshold that is used to determine a search possibility and an outlier is difficult to be defined arbitrarily for the purpose of improved efficiency, because the threshold is determined depending on an object image in consideration of a proper elimination rate, and an acceptance rate of an outlier.

In recent years, there is a proposed method that improves search performance (a search possibility rate, a non-outlier rate) by reducing a search range in addition to reduction of a search computation amount. Moreover, since the reduction of a search range tends to decrease a template size, improvement in accuracy is also expectable. For example, in a case where a motion vector caused by a motion of an object image due to a motion of an image pickup apparatus is searched, the motion of the object image in frames can be reduced by using a camera shake correcting function of the image pickup apparatus. The reduction of an assumed motion of an image between search frames enables to narrow the search range (see Japanese Laid-Open Patent Publication (Kokai) No. H8-275049 (JP H8-275049A)).

Moreover, rough positions of corresponding points are specified on the basis of information combining position-posture information detected with a gyro sensor, focal length information, etc., and fragmentary information about a motion of an image caused by a camera shake of the image pickup apparatus. Furthermore, there is a proposed technique that moves a center position of a search range to narrow a search range (see Japanese Laid-Open Patent Publication (Kokai) No. 2009-49457 (JP 2009-49457A)).

When a search range is simply determined under a condition where an effect of an optical image stabilization is maximized, and when a camera shake momentarily exceeds a movable range of an optical image stabilizing mechanism and a margin range of an electronic image stabilization, a motion vector protrudes from the search range. On the other hand, when a search range is determined according to the worst case, the effect of the search range restriction is not obtained.

Moreover, even if the existing ideas described in the background art and the techniques of the above-mentioned two publications are merely combined, the improved efficiency expected is not obtained. For example, a motion of an image is reduced with the image stabilizing function of the image pickup apparatus shown in JP H8-275049A. In addition, when the search position control on the basis of the position-posture information that does not assume to use the optical image stabilization shown in JP 2009-49457A is combined, the reduction of the motion of the image with the optical image stabilization conflicts with the rough prediction positions of the corresponding points indicated by the motion vector that is obtained from the position-posture information. As a result, the effect of the search range restriction is not obtained. This becomes remarkable as the optical image stabilization effect is raised by increasing the damping rate of the optical image stabilization.

SUMMARY OF THE INVENTION

The present invention improves image stabilization performance by improving motion vector search performance by restricting a search range even for an image with a large motion due to a camera shake of an image pickup apparatus at a tele-end side of a zoom lens or a shoot while walking at a wide-end side.

Accordingly, a first aspect of the present invention provides an image processing apparatus comprising a motion vector search unit configured to search for a motion vector of a reference image later input with respect to a standard image input previously, and a control unit configured to set at least one of a search range and a search position of a motion vector searched by the motion vector search unit based on position-posture change information about an image pickup apparatus and image stabilization control information.

Accordingly, a second aspect of the present invention provides an image processing apparatus comprising a motion vector search unit configured to search for a motion vector of a reference image later input with respect to a standard image input previously, and a control unit configured to receive position-posture change information about an image pickup apparatus detected by a rotation sensor that is attached to a rotation axis coaxial to an optical axis of the image pickup apparatus, to expand a search range for a motion vector by the motion vector search unit when a rotation amount around the rotation axis is larger than a predetermined value, and to reduce the search range when the rotation amount around the rotation axis is smaller than the predetermined value.

Accordingly, a third aspect of the present invention provides a control method for an image processing apparatus comprising a motion vector search step of searching for a motion vector of a reference image later input with respect to a standard image input previously, and a control step of setting at least one of a search range and a search position of a motion vector searched in the motion vector search step based on position-posture change information about an image pickup apparatus and image stabilization control information.

Accordingly, a fourth aspect of the present invention provides a non-transitory computer-readable storage medium storing a control program causing a computer to execute the control method of the third aspect.

Accordingly, a fifth aspect of the present invention provides an image pickup apparatus comprising an image stabilization unit, an image pickup device, a motion vector search unit configured to search for a motion vector of a reference image later input from the image pickup device with respect to a standard image input previously, a detection unit configured to detect position-posture change information about an image pickup apparatus, a control unit configured to set at least one of a search range and a search position of a motion vector searched by the motion vector search unit based on the position-posture change information detected by the detection unit and image stabilization control information obtained from the image stabilizing unit.

Accordingly, a sixth aspect of the present invention provides an image pickup apparatus comprising an image stabilization unit, an image pickup device, a motion vector search unit configured to search for a motion vector of a reference image later input from the image pickup device with respect to a standard image input previously, a rotation sensor that is attached to a rotation axis coaxial to an optical axis of the image pickup apparatus, and a control unit configured to receive position-posture change information about the image pickup apparatus detected by the rotation sensor, to expand a search range for a motion vector by the motion vector search unit when a rotation amount around the rotation axis is larger than a predetermined value, and to reduce the search range when the rotation amount around the rotation axis is smaller than the predetermined value.

According to the present invention, the motion vector search performance is improved by restricting the search range even for an image with a large motion due to a camera shake of the image pickup apparatus at the tele-end side or photographing while walking at the wide-end side.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
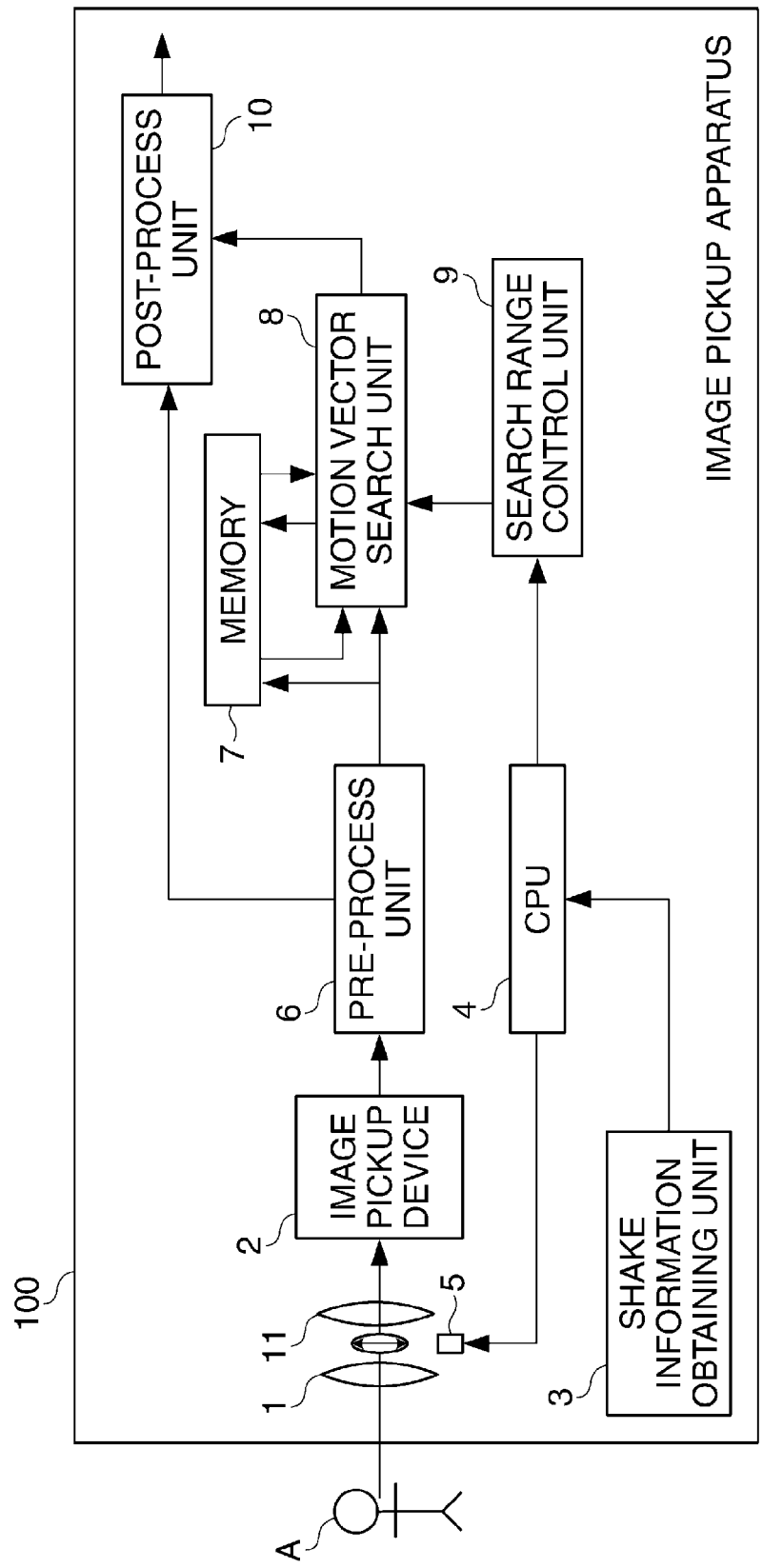
FIG. 1 is a block diagram schematically showing a configuration of an image pickup apparatus equipped with an image processing apparatus according to a first embodiment of the present invention.

FIG. 1 is a block diagram schematically showing a configuration of an image pickup apparatus equipped with an image processing apparatus according to a first embodiment of the present invention.

As shown in FIG. 1, the image pickup apparatus 100 is provided with an optical system 1, an image pickup device 2, a shake information obtaining unit 3, a CPU (central processing unit) 4, an optical image stabilization control unit 5, a pre-process unit 6, a memory 7, a motion vector search unit 8, a search range control unit 9, a post-process unit 10, and a correction member 11. In the configuration in FIG. 1, the CPU 4, the motion vector search unit 8, and the search range control unit 9 constitute the image processing apparatus for an image stabilization process.

The optical system 1 is a component that images the light emitted from an object A on the image pickup device 2, and consists of a plurality of lenses and mirrors. The optical system 1 is provided with an optical image stabilizing mechanism that reduces blur of an image due to a shake of the image pickup apparatus 100 by moving the position of an optical image on the image pickup device 100 in parallel by moving a part of lenses that are the correction member 11 for correcting image blur in parallel. It should be noted that the image pickup device 2 may employ a correction member for correcting image blur that consists of mechanical parts, such as a piezo-electric element etc., instead of the correction member 11 within the optical system 1, and that an image blur due to a camera shake may be reduced by moving the image pickup device 2 in a plane perpendicular to the optical axis of the optical system 1 in parallel. Moreover, an electronic image stabilization mechanism that electronically reduces image blur due to a camera shake by controlling a region of an image output as image signals from the image pickup device 2 may be employed alternatively.

The image pickup device 2 converts an optical image formed on the sensor face into electrical signals.

The shake information obtaining unit 3 is a position-posture sensor, such as a gyro sensor, and is attached to an arbitrary axis that intersects perpendicularly to the optical axis of the optical system. Then, the position-posture change of the image pickup apparatus 100 is measured, and the information about the position-posture change is given to the CPU 4. For example, when the shake information obtaining unit 3 includes rotation sensors, they are respectively attached to axes in a Yaw direction, a Pitch direction, and a Roll direction of the image pickup apparatus, and detect the posture changes caused by rotations around the axes. The rotation axes perpendicular to the optical axis are in the Yaw direction and the Pitch direction, and the rotation axis parallel to the optical axis is in the roll direction. It should be noted that the shake information obtaining unit 3 may further include an acceleration sensor and an earth magnetism sensor to improve performance and accuracy for detecting a position-posture change.

When the shake information obtaining unit 3 does not include a digital sensor but includes an analog sensor, a DC cut filter, an amplifier, an A/D (analog/digital) converter, etc. (not shown) are added to the configuration. The DC cut filter intercepts a direct current (DC) drift component included in the output angular velocity signal, and allows an alternating current component (i.e., an oscillating component) only to pass, when the shake information obtaining unit 3 includes a rotation sensor. The amplifier amplifies and outputs the angular velocity signal output by passing the DC cut filter. The A/D converter digitizes and outputs the angular velocity signal amplified with the amplifier. When these functions are mounted as a sensor assembly, it is possible to omit the implementation at the side of the image pickup apparatus. It should be noted that the DC cut filter may be used together even in the case of the digital sensor when it is not achieved by a function in the sensor assembly.

The CPU 4 reads a control program from the memory (not shown) and runs it to control operations of the parts of the image pickup apparatus 100. The CPU 4 controls the optical image stabilization control unit 5 on the basis of the information about the position-posture change detected by the shake information obtaining unit 3 in this embodiment. An internal configuration of the CPU 4 for controlling the optical image stabilization control unit 5 is shown in FIG. 2.

Figure 2:
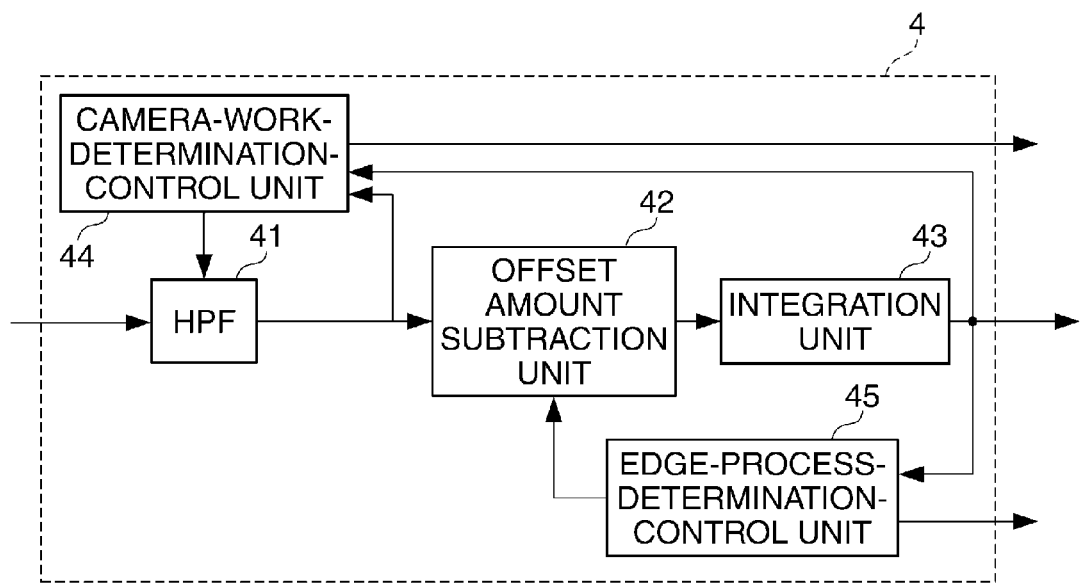
FIG. 2 is a block diagram showing an internal configuration of a CPU for controlling an optical image stabilization control unit in FIG. 1.

As shown in FIG. 2, the CPU 4 is provided with a HPF (high-pass filter) 41, an offset amount subtraction unit 42, an integration unit 43, a camera-work-determination-control unit 44, and an edge-process-determination-control unit 45.

The HPF 41 intercepts a low-frequency component below a low-pass cutoff frequency set among the frequency components of the information about the position-posture change received from the shake information obtaining unit 3, for example, the angular velocity signal (angular velocity information), and outputs a high frequency component exceeding the low-pass cutoff frequency. The cutoff frequency is determined by the camera-work-determination-control unit 44.

The offset amount subtraction unit 42 performs a process for subtracting a predetermined offset amount from the position-posture change information output from the HPF 41. The offset amount is determined by the edge-process-determination-control unit 45.

The integration unit 43 integrates the position-posture change information after subtracting the offset amount output from the offset amount subtraction unit 42, and outputs the position-posture displacement information that is a result of integration to the optical image stabilization control unit 5 as correction amount information. A time constant of the integration is determined by the camera-work-determination-control unit 44.

The camera-work-determination-control unit 44 determines whether a camera work is applied on the basis of the position-posture change information output from the HPF 41 (or the shake information obtaining unit 3) and the position-posture displacement information output from the integration unit 43 (camera-work determination). The camera work includes what are intended by a photographer, such as panning and tilting applied to the image pickup apparatus 100. Moreover, the camera-work-determination-control unit 44 changes/determines the cutoff frequency of the HPF 41 mentioned above, and changes/determines the time constant of the integration by the integration unit 43 as camera work controls.

The edge-process-determination-control unit 45 determines whether the edge process is needed on the basis of the position-posture displacement information output from the integration unit 43 (the correction amount information and the changing amount of the position and posture, in other words), and changes the offset amount of the offset amount subtraction unit 42 as the edge process control, for example. The edge process prevents occurrence of an unnatural image due to momentary change of the damping effect because the correction amount of the image stabilization reaches the physical movable limit of the correction member 11 or the electric correction limit. For example, a process that lowers the damping rate gradually when approaching an edge is performed.

Referring back to FIG. 1, the optical image stabilization control unit 5 controls the correction member 11 that performs an optical image stabilization, and performs the image stabilization. That is, when the correction member 11 is included in the optical system 1, the optical image stabilization control unit 5 controls the parallel movement of the lens used as the correction member 11. On the other hand, when the correction member 11 is the image pickup device, the parallel movement of the image pickup device 2 is controlled. When the image blur is corrected electronically, the region within an image read from the image pickup device 2 is controlled.

When the correction amount information input into the optical image stabilization control unit 5 is angular information, and the correction amount information within the CPU 4 is the angular information, the angular information is used as control information as is. On the other hand, when the parallel moving amount of the correction member 11 and the parallel moving amount of the image pickup device 2 are related, the correction information processed within the CPU 4 is input into the optical image stabilization control unit 5. For example, when the parallel moving amount of the image pickup device 2 is input, a processed correction amount x shown in (Formula 1) is input where the position-posture displacement information is the angular information θ and the focal length is f.

$$x = f \tan \theta \quad \text{[Formula 1]}$$

When the input correction amount x exceeds a controllable limit of the image pickup apparatus, the correction amount is clipped to a correctable range. Occurrence of the clipping causes an edge contact, which causes an unnatural state of an image in which the damping effect of the image stabilization breaks off suddenly.

The pre-process unit 6 shown in FIG. 1 applies processes of noise reduction by phase double sampling (CDS), exposure control by rising gain of automatic gain control (AGC), black level correction, A/D conversion, etc. to the analog image signal that is photoelectrically converted by the image pickup device 2. Then, the image signal converted into the digital signal is output.

Moreover, the pre-process unit 6 may generate a color image or a brightness image by Bayer array interpolation etc. to the input image to the motion vector search unit 8 separately. A simple level for searching for a motion vector is sufficient for this purpose. Moreover, filtering processes using a high-pass filter and a low-pass filter, and a tone adjustment process like tone mapping etc. may be performed in order to improve accuracy and robustness of a motion vector detection process. Since the pre-process mainly processes an analog signal, the main part is also called an AFE (analog front end). On the other hand, what is used together with a digital output sensor is called a DFE (digital front end).

The memory 7 temporarily stores a pre-processed image signal generated by the pre-process unit 6.

The motion vector search unit 8 presumes a motion vector between images using the image signal output from the pre-process unit 6 and the image signal (the past image signal) accumulated in the memory 7. The motion vector search unit 8 detects the motion vectors among a plurality of input frames. A motion vector is computed between the current frame that was last processed by the pre-process unit 6 and is input and the past frame that was once stored in the memory 7 and is input. The current frame may not necessarily be adjacent to the past frame. In computation of a motion vector, a motion vector between frames, corresponding points, or a locus of a feature point is computed by the TM, the table matching that associates feature points extracted from the frames, motion vector presumption (optical flow presumption) based on a gradient method, etc.

The search range control unit 9 controls the size of the search range in the motion vector search in the motion vector search unit 8 according to an instructions from the CPU 4.

The post-process unit 10 applies backend image processes including Bayer array interpolation, a linearization matrix process, white balance adjustment, YCC conversion, color-difference/tone/contrast correction, edge emphasis, etc. to the input digital image signal. The backend image processes are called DBE (digital back end) processes against the AFE (analog front end) processes of the pre-process unit 6. One output image is generable by performing the front end process and back end process. Moreover, the image stabilization of a video image is performed by changing geometrically so as to reduce image blur by combining an output image signal and motion blur information, which is a motion vector or corresponding point information and a locus of a feature point.

Dynamic range expansion (HDR) that generate an image with wide dynamic range by compositing a plurality of registration images using the motion vector obtained by the motion vector search unit 8, multi-image noise reduction (NR), a super-resolution process, etc. are classified to the post processes. The output image formed in one shoot image or a moving image is generated according to these processes. Moreover, the motion blur information may be treated as meta-information or separately managed information about an image as supplemental image information, and may be used for implementing options, such as three-dimensional reconstruction, spatial mapping, and recognition.

The image information processed by the post-process unit 10 is temporarily stored in a DRAM (not shown) etc. or is directly transmitted to latter-stage process units. The latter-stage process units include a coding unit for converting into a desired storage format, a recording unit consisting of a semiconductor memory etc., and a display unit consisting of an LCD etc., for example. Moreover, the latter-stage process units include an external input/output I/F (interface) that consists of interfaces to which a wireless LAN, and cables of a wired LAN, USB, etc. are connectable.

Next, camera-work-determination control in the image pickup apparatus 100 in FIG. 1 will be described.

Figure 3:
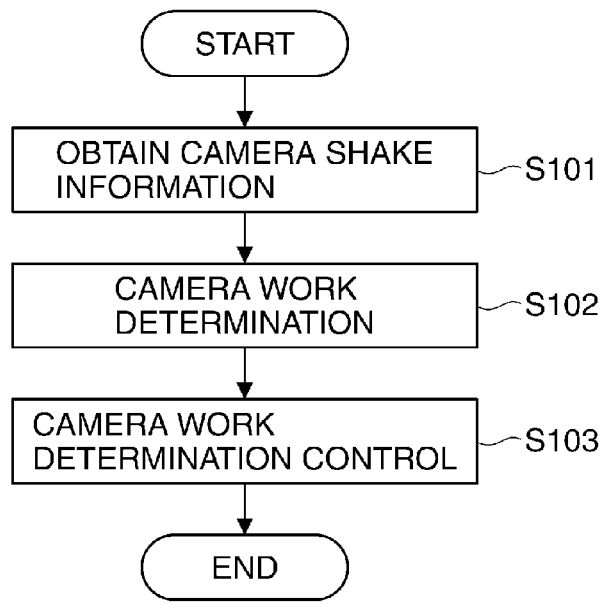
FIG. 3 is a flowchart showing a camera-work-determination control process executed by the image pickup apparatus in the first embodiment.

FIG. 3 is a flowchart showing a camera-work-determination control process executed by the image pickup apparatus in the first embodiment. It should be noted that the shake information obtaining unit 3 may output position-posture change information at a sampling timing (1 kHz) of a gyro sensor, for example, in the process shown in FIG. 3. The shake information obtaining unit 3 repeatedly detects the position-posture change information at the predetermined intervals.

As shown in FIG. 3, the camera-work-determination-control unit 44 obtains the position-posture change information output from the HPF 41 (or the shake information obtaining unit 3) and the position-posture displacement information output from the integration unit 43 in step S101. It should be noted that the position-posture change information will be described as angular velocity information detected by a gyro sensor, and the position-posture displacement information will be described as angular displacement information that is integration of the angular velocity information in the following description. When the position change is detected using an acceleration sensor and the position displacement is treated, the same process is performed hereinafter.

In the next step S102, the camera-work-determination-control unit 44 determines whether a camera work exists depending on whether the absolute value of the angular velocity information or the absolute value of the angular displacement information obtained in the step S101 is equal to or more than each threshold (a camera-work-start-determination threshold). When it is determined that the absolute value of the angular velocity information or the absolute value of the angular displacement information is equal to or more than each threshold, a camera-work-determination flag is set to ON.

In the above-mentioned camera-work determination, an intensity level of the absolute value of the angular velocity information or the absolute value of the angular displacement information may be determined in addition to determine ON/OFF of the camera-work-determination flag. For example, an intensity level of the camera-work determination is determined according to the higher one of the intensity level obtained from the absolute value of the angular velocity information and the intensity level obtained from the absolute value of the angular displacement information.

In the camera-work determination in the step S102, when both the absolute value of the angular velocity information and the absolute value of the angular displacement information are less than respective thresholds (camera-work-end-determination thresholds), it is determine that there is no camera work and the camera-work-determination flag is set to OFF.

The above mentioned camera-work-start-determination threshold and camera-work-end-determination threshold may be set to mutually different values. For example, when the camera-work-start-determination threshold is set to be higher than the camera-work-end-determination threshold, a stable change becomes possible.

In step S103, the camera-work-determination-control unit 44 changes the cutoff frequency of the HPF 41 and the integral time constant of the integration unit 43 according to ON/OFF of the camera-work-determination flag or the intensity level of the camera-work determination. The control method in the step S103 will be described with reference to FIG. 4A and FIG. 4B.

Figure 4A:
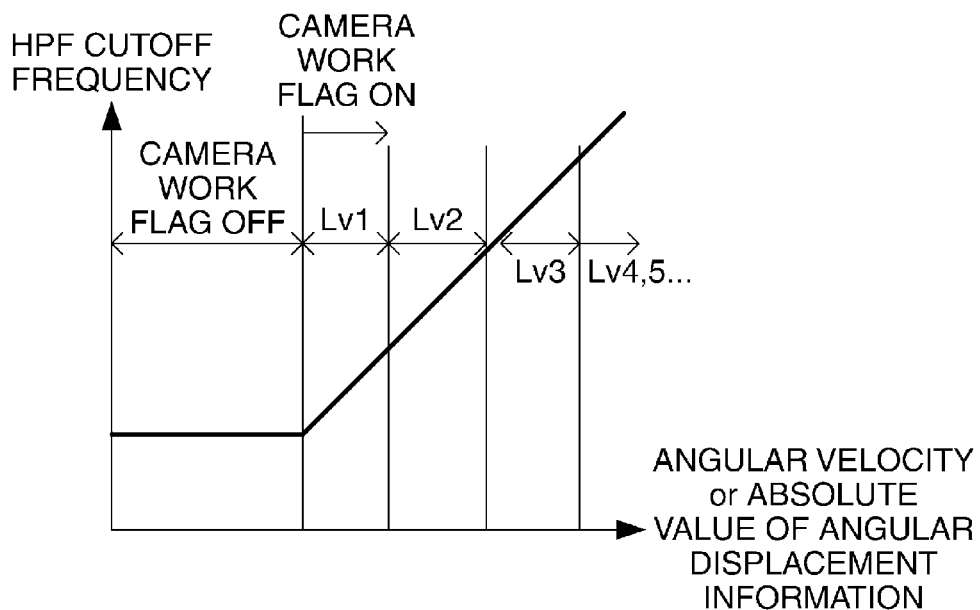
FIG. 4A is a graph showing a relation between cutoff frequency and angular velocity or an absolute value of angular displacement data.

As shown in FIG. 4A, when the camera-work-determination flag is ON, the value of the cut-off frequency used for the calculation in the HPF 41 is increased in proportion to the intensity level of the camera-work determination (the absolute value of the angular velocity information or the absolute value of the angular displacement information) so as to be higher (at the high frequency side) than the value of the cut-off frequency at the time when the camera-work-determination flag is OFF. Then, the attenuation factor for the low frequency signal is made larger than the attenuation factor at the time when the camera-work-determination-flag is OFF. Accordingly, the sensitivity of the image stabilization to a slow movement with large amplitude is lowered. It should be noted that the intensity level of the camera-work determination is divided into a plurality of stages Lv1, Lv2, Lv3, . . . , and the same cutoff frequency (for example, a mean value in each stage) may be used in each stage. In this case, the graph in FIG. 4A becomes step-wise.

Figure 4B:
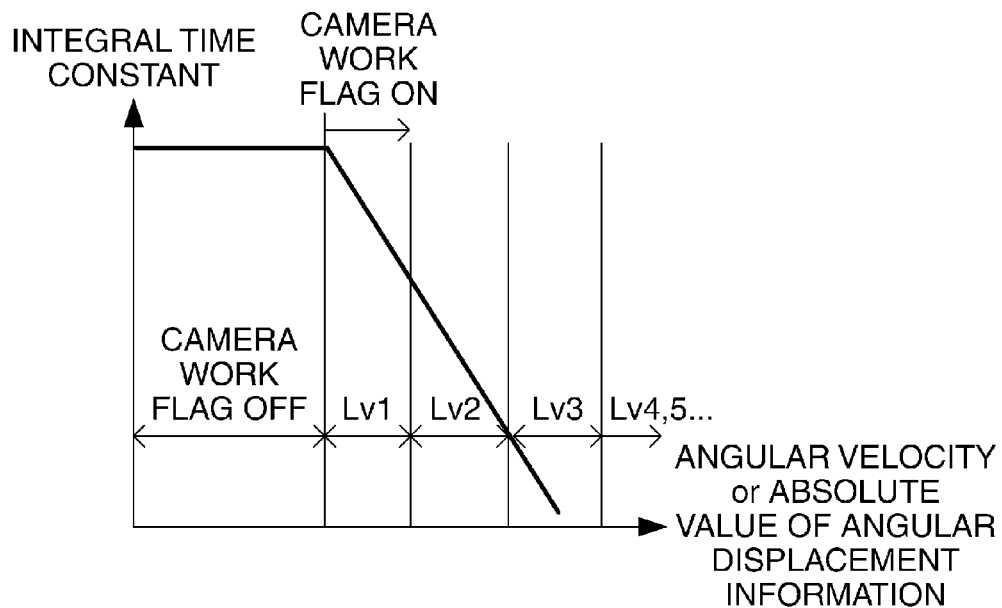
FIG. 4B is a graph showing a relation between an integral time constant and angular velocity or an absolute value of angular displacement data.

On the other hand, as shown in FIG. 4B, when the camera-work-determination flag is ON, the value of the time constant used for the calculation in the integration unit 43 is decreased in inversely proportional to the intensity level of the camera-work determination (the absolute value of the angular velocity information or the absolute value of the angular displacement information) so as to be smaller than the value of the time constant at the time when the camera-work-determination flag is OFF.

Accordingly, the feedback gain from the past is lowered, and the speed that the angular displacement information as an integrated result returns to the reference value (for example, zero displacement) increases. It should be noted that the intensity level of the camera-work determination is divided into a plurality of stages Lv1, Lv2, Lv3, . . . , and the same integral time constant (for example, a mean value in each stage) may be used in each stage. In this case, the graph in FIG. 4B becomes step-wise.

Next, edge-process-determination control in the image pickup apparatus 100 will be described.

When magnitude of an image blur due to a camera shake caused by photographing while walking etc. exceeds the correctable range of the optical image stabilizing mechanism and the operation of the optical image stabilizing mechanism continues, an edge contact occurs. When the edge contact occurs, the damping effect breaks off suddenly and the image becomes unnatural. Accordingly, an edge process that lowers a damping rate gradually as it approaches the edge is performed to avoid rapid edge contact.

Figure 5:
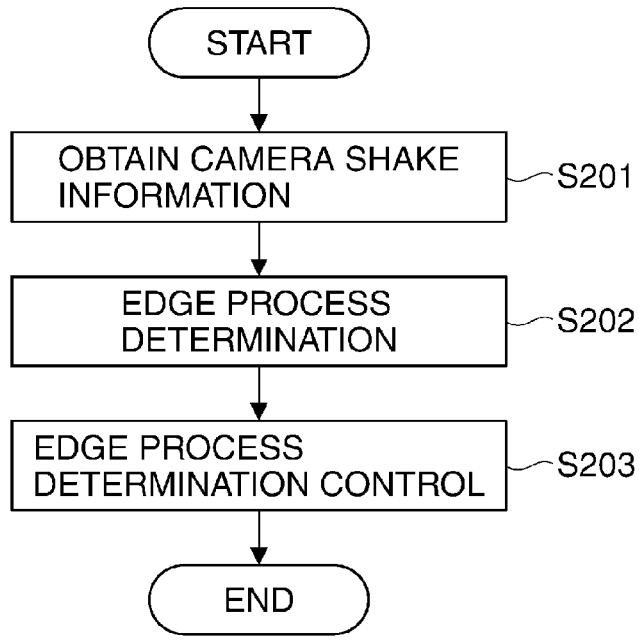
FIG. 5 is a flowchart showing an edge-process-determination control process executed by the image pickup apparatus in the first embodiment.

FIG. 5 is a flowchart showing an edge-process-determination control process executed by the image pickup apparatus 100 in the first embodiment. It should be noted that the shake information obtaining unit 3 may output the position-posture change information at the sampling timing (1 kHz) of the gyro sensor as with the camera-work-determination-control process mentioned above. The shake information obtaining unit 3 repeatedly detects the position-posture change information at the predetermined intervals.

In step S201 in FIG. 5, the edge-process-determination-control unit 45 obtains the position-posture displacement information output from the integration unit 43. Furthermore, the edge-process-determination-control unit 45 computes change speed of the position-posture displacement information on the basis of the difference between the position-posture displacement information that was obtained and stored in the memory (not shown) and the position-posture displacement information obtained currently.

It should be noted that the position-posture displacement information will be described as angular displacement information, and the change speed of the position-posture displacement information will be described as change speed of the angular displacement information in the following description as with the above-mentioned camera-work-determination control process.

In the next step S202, the edge-process-determination-control unit 45 determines whether the edge process is needed depending on whether the absolute value of the angular displacement information obtained in the step S201 or the absolute value of the change speed of the angular displacement information computed in the step S201 is equal to or more than each threshold. When it is determined that the absolute value of the angular displacement information or the absolute value of the change speed of the angular displacement information is equal to or more than each threshold (an edge-process start determination threshold), it is determined that the edge process is needed, and an edge-process-determination flag is set to ON.

In the above-mentioned edge-process determination, an intensity level of the absolute value of the angular displacement information or the absolute value of the change speed of the angular displacement information may be determined in addition to determine ON/OFF of the edge-process-determination flag. For example, an intensity level of the edge-process determination is determined according to the higher one of the intensity level obtained from the absolute value of the angular displacement information and the intensity level obtained from the absolute value of the change speed of the angular displacement information.

In the edge-process determination in the step S202, when the absolute value of the angular displacement information and the absolute value of the change speed of the angular displacement information are less than the respective thresholds (edge-process end determination thresholds), it is determined that the edge process is not needed, and the edge-process-determination flag is set to OFF.

The edge-process start determination threshold and edge-process end determination threshold may be mutually different as with the determination thresholds concerning the above-mentioned camera work. For example, when the edge-process-start-determination threshold is set to be higher than the edge-process-end-determination threshold, a stable change becomes possible.

In step S203, the edge-process-determination-control unit 45 controls an offset amount of the offset amount subtraction unit 42 according to ON/OFF of the edge-process-determination flag or the intensity level of the edge-process determination. The control method in the step S203 will be described with reference to FIG. 6.

Figure 6:
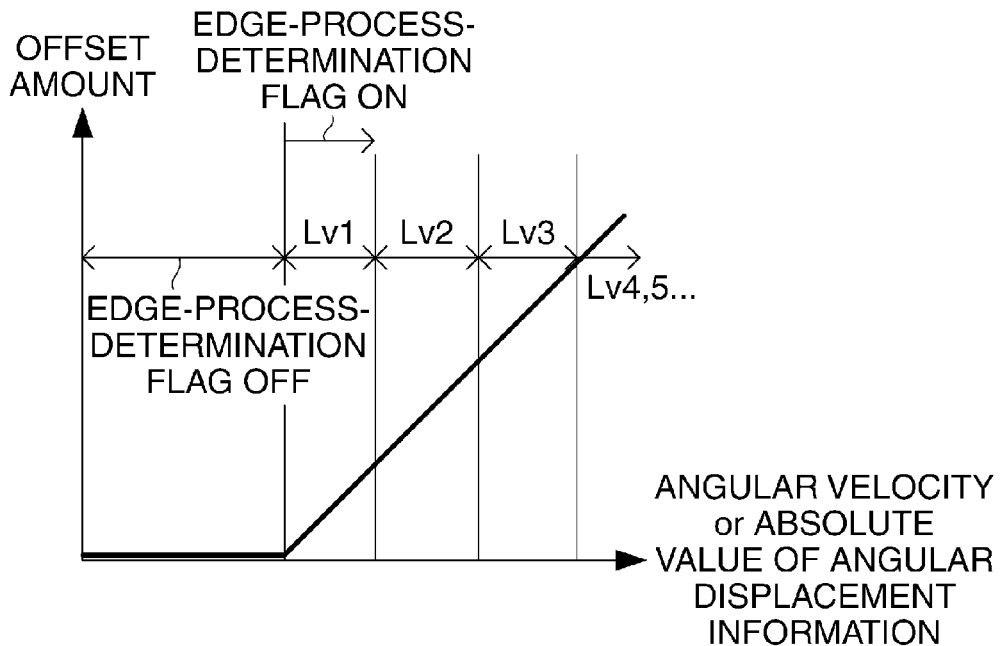
FIG. 6 is a graph showing a relation between an offset amount and angular velocity or the absolute value of an angular displacement data.

As shown in FIG. 6, when the edge-process-determination flag is ON, the offset amount of the offset amount subtraction unit 42 is increased in proportional to the intensity level of the edge-process determination (the absolute value of the angular velocity information or the absolute value of the change speed of the angular displacement information) so as to be larger than the offset amount at the time when the edge-process-determination flag is OFF. The sign of the offset amount is controlled so that the output value of the offset-amount subtraction unit 42 with the edge-process-determination flag being ON becomes smaller than the output value with the edge-process-determination flag being OFF, and is controlled so that the output value decreases as the intensity level of the edge-process-determination increases. Accordingly, a bias that usually pulls back the angular velocity information to the reference value (for example, zero displacement, a neutral position of the optical image stabilizing mechanism) becomes stronger as it approaches the edge, which reduces the possibility to cause the edge contact. It should be noted that the intensity level of the edge-process determination is divided into a plurality of stages Lv1, Lv2, Lv3, . . . , and the same offset amount (for example, a mean value in each stage) may be used in each stage. In this case, the graph in FIG. 6 becomes step-wise.

It should be noted that the states of the determination flags or the intensity levels of the camera-work-determination control and edge-process-determination control are always monitored by the CPU 4, and are transferred to the search range control unit 9.

Although the camera-work-determination control and the edge-process-determination control have been described separately in this embodiment, they are the same processes in the sense that they detect the large camera shake applied to the image pickup apparatus using the position-posture change information and prevent the edge contact. The offset subtraction of the edge process may be employed in order to raise the damping effect to the camera work, or the above-mentioned control processes may be used in order to prevent the edge contact. Moreover, the methods of the camera-work determination and edge-process determination may be combined.

Next, a motion vector search process in the image pickup apparatus 100 will be described.

The motion vector search process is repeatedly performed at every predetermined timing (for example, at every frame obtaining timing of 30 fps or 60 fps).

Figure 7A:
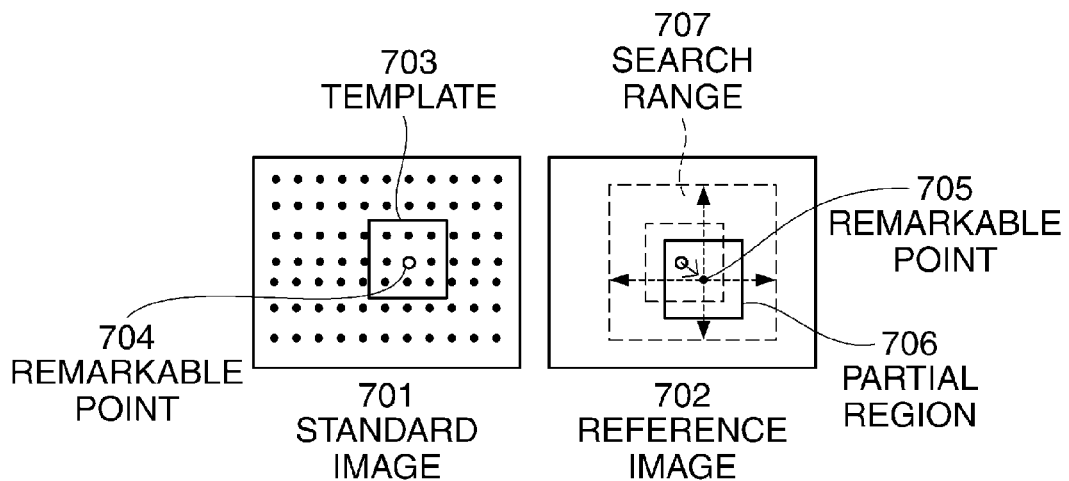
FIG. 7A and FIG. 7B are views showing examples of block matching in a motion vector search.
Figure 7B:
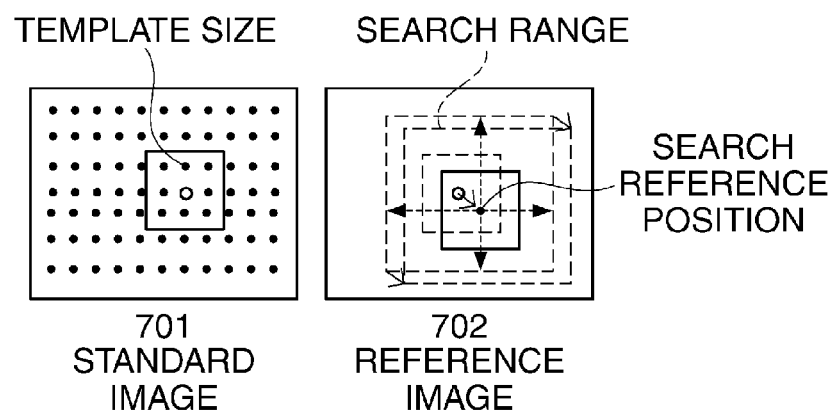

FIG. 7A is a view showing an example of block matching that is a kind of the TM. FIG. 7B is a view showing main controllable parameters in a motion vector search.

In FIG. 7A and FIG. 7B, a left image 701 is a standard image, and a right image 702 is a reference image. For example, a motion vector is detected by using a previously input frame as the standard image and a later input current frame as the reference image. A partial region of a predetermined size around a remarkable point 704 that is one of grid points arranged in the left image is defined as a template 703. An arbitrary search range 707 is set in the reference image 702. A position of a partial region 706 where the partial region 706 mostly matches the template 703 is searched while moving the partial region 706 within the search range 707. It should be noted that the input images may be modulated images, such as a color image, a luminance image, and a differential image.

A similarity score between the partial region 706 around a remarkable point 705 in the right image (reference image) and the template 703 in the standard image will be computed. Correlation operations, such as SSD (Sum of Square Difference), SAD (Sum of Absolute Difference), and normalized cross correlation, are used as the similarity scores. When luminance changes sharply between frames as in a case of a real photographed image, the normalized cross correlation is mainly used. A formula for computing the similarity score of the normalized cross correlation is shown in Formula 2.

$$R(x, y, x', y') = \frac{\sum_{i=-M_T}^{M_T} \sum_{j=-N_T}^{N_T} \{I_{(x,y)}(i,j) - \bar{I}\}\{I'_{(x',y')}(i,j) - \bar{I}'\}}{\sqrt{\sum_{i=-M_T}^{M_T} \sum_{j=-N_T}^{N_T} \{I_{(x,y)}(i,j) - \bar{I}\}^2} \sqrt{\sum_{i=-M_T}^{M_T} \sum_{j=-N_T}^{N_T} \{I'_{(x',y')}(i,j) - \bar{I}'\}^2}}$$ [Formula 2]

where $$\bar{I} = \frac{1}{M_T N_T} \sum_{i=-M_T}^{M_T} \sum_{j=-N_T}^{N_T} I_{(x,y)}(i,j),$$

$$\bar{I}' = \frac{1}{M_T N_T} \sum_{i=-M_T}^{M_T} \sum_{j=-N_T}^{N_T} I_{(x',y')}(i,j)$$

Coordinates (x, y) and (x', y') respectively indicate positions of the template 703 in the standard image I and the reference image I'. $I_{(x,y)}(i,j)$ and $I'_{(x',y')}(i,j)$ show the partial region 706.

The similarity scores for all the partial regions 706 of the remarkable point 705 in the search range 707 are computed. Then, a motion vector is computed by considering that the position with the highest similarity score (for example, the highest correlation score) is a correspondence position. If there is no occlusion, motion vectors of which the number is equal to the number of the remarkable points 704 set in the standard image are fundamentally computed. Each of the motion vectors is expressed as a vector of which a starting point is the remarkable point in the standard image and an end point is the corresponding point in the reference image.

$$(x,y,x',y')_i, i=1, \ldots, m$$ [Formula 3]

(m: The number of motion vectors)

Moreover, the peak position of the similarity score may be computed with higher accuracy by applying polynomial fitting to the correlation score in the search range. The motion vector and the locus of the corresponding point may be computed with subpixel accuracy by increasing the pixel numbers in the template and the reference image.

Although the block matching that fixes the remarkable point to the grid point has been described, a feature point that is suitable to compute a motion vector may be extracted from the standard image, and a motion vector may be searched by assuming that the position is a remarkable point. Image processing filters, such as a Harris operator (See C. Harris and M. Stephens, "A combined corner and edge detector", Fourth Alvey Vision Conference, pp. 147-151, 1988.) are usually used in order to extract a remarkable point. Extraction of a corner position of an image as a feature point reduces an opening problem and a "slide" problem, which occur by searching at a position without a suitable feature, improves a search possibility rate, reduces an outlier rate, and improves accuracy.

The Harris operator determines a window size W and computes a differential image ($I_{dx}$, $I_{dy}$) about horizontal and vertical directions. A Sobel filter etc. may be used for calculating the differential image. For example, a 3×3 filter hx in which three filters of Formula 4 are directed in the horizontal direction and are aligned in the vertical direction, and a 3×3 filter by in which three filters of Formula 4 are directed in the vertical direction and are aligned in the horizontal direction are applied to the image, and the differential image ($I_{dx}$, $I_{dy}$) is obtained. Then, a matrix G is calculated according to Formula 5 using the window W for all the coordinates (x, y) within the image.

$$h = \lfloor 1, \sqrt{2}, 1 \rfloor / (2 + \sqrt{2})$$ [Formula 4]

$$G = \begin{bmatrix} \sum_W I_x^2 & \sum_W I_x I_x \\ \sum_W I_x I_x & \sum_W I_y^2 \end{bmatrix}$$ [Formula 5]

Coordinates (x, y) of feature points are extracted in order of the larger minimum singular value of the matrix G. In this case, it is preferable that the feature points do not crowd extremely. For example, a rule that a feature point is not extracted from the periphery of the window size W of a coordinate (x, y) that has been already extracted as a feature point may be established.

Among continuous frames, a feature point may be found again to perform the TM, a locus of a feature point may be tracked by performing the TM between new frames by assuming that the end of the obtained motion vector is the feature point.

Moreover, a matching by inner product computing etc. may be performed between feature points computed in frames using feature quantity as key information to associate the feature points. For example, when a pruning algorithm is used, since a redundant matching operation is reducible, an efficient matching is possible.

Next, a flow of a motion vector search will be described with reference to FIG. 8A through FIG. 8D.

Figure 8A:
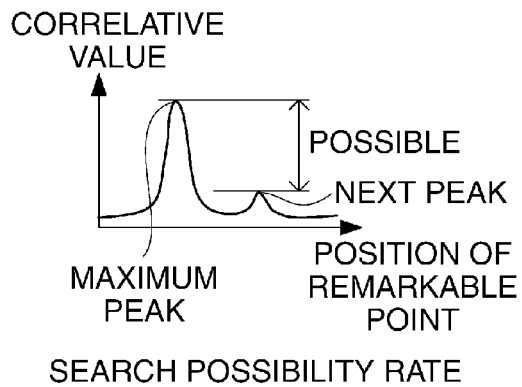
FIG. 8A and FIG. 8B are graphs for describing search possibility rate.
Figure 8B:
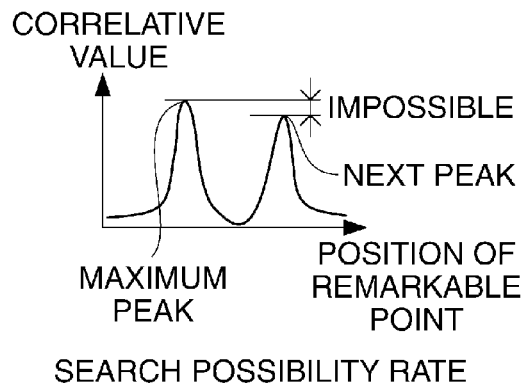

FIG. 8A and FIG. 8B are views for describing a search possibility rate. It should be noted that correlative value maps that are two dimensional originally are illustrated as one dimensional maps for simplification of description in FIG. 8A and FIG. 8B.

The search possibility rate indicates a ratio of possibility that a unique peak is obtained on a correlation value map as mentioned above. A correlative value graph (actually two-dimensional map) as shown in FIG. 8A or FIG. 8B is obtained by computing the correlation score for every remarkable point in a search range, When a difference between the correlative value of the maximum peak of the highest correlation score and the correlative value of the next peak is larger enough than a threshold as shown in FIG. 8A, it is determined that the unique peak is obtained. On the other hand, when a difference between the correlative value of the maximum peak and the correlative value of the next peak is not larger than the threshold as shown in FIG. 8B, it is determined that the unique peak is not obtained. Thus, uniqueness of the peak of the correlation score is determined according to the difference between the peak position and the next peak position, or the acuity of the peak, and the search possibility is determined on the basis of the uniqueness.

It should be noted that a sufficient texture property of the template file is required as a necessary condition to obtain a unique peak about the correlation values. Accordingly, the search possibility may be determined by checking lack of the texture property of the template file by comparing a score like dispersion with threshold before the search in order to remove ambiguous correspondence. In general, it becomes difficult to obtain a unique peak as the search range spreads because similar patterns tend to obtain. On the other hand, it becomes easy to obtain a unique peak as the template size increases.

Figure 8C:
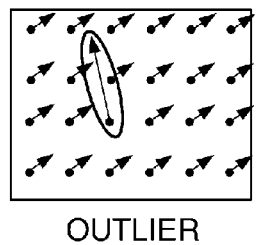
FIG. 8C is a view for describing an outlier.

FIG. 8C is a view for describing an outlier.

The outlier rate is a ratio in which a motion vector that is output by the TM as a correct result is incorrect greatly. When a target of the motion vector search is an image that a flat-surface scene parallel to a static image surface is photographed while shifting the image pickup apparatus to the lower left, the same motion vectors should be obtained in all the remarkable points as shown in FIG. 8C.

However, there is the motion vector that is greatly wrong with respect to the correct motion vectors due to a search error. This is called an outlier and its ratio is called an outlier rate. Generally, when the determination threshold is loosened, although the search possibility rate improves, the outlier rate also goes up.

Moreover, when the search range is extended while maintaining the determination threshold so as to maintain the search possibility rate and template size, the outlier rate tends to go up.

Moreover, an outlier tends to occur in an occlusion part. An occlusion part is detected by bidirectionality that is inspected by exchanging the standard image 201 with the reference image 202 and searching, threshold determination with the minimum correlation score, etc.

Figure 8D:
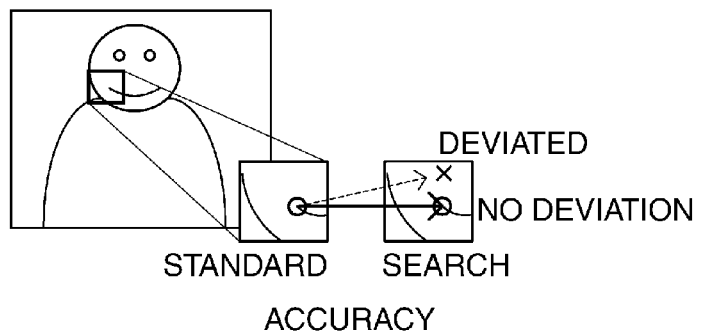
FIG. 8D is a view for describing accuracy.

FIG. 8D is a view for describing the accuracy.

The accuracy is a parameter about slight deviation of the motion vector from a true motion vector that is not as large as the outlier. For example, that is a case where the motion vector (lower right) to the template cut around a certain specific remarkable point includes a slight error that is not as large as the outlier as shown in FIG. 8D. Deviation of accuracy mainly occurs due to parallax competition.

Difference between an outlier and a non-outlier cannot be determined at the time of the motion vector search. The difference can be determined only after comparing the ideal correct motion vector (Ground Truth that is a correct answer) with a motion vector obtained by inputting an image pair. The quantitative value of accuracy can be also determined under the same condition. An outlier is determined using the determination threshold with respect to an error of a motion vector.

The accuracy drops due to modification resulting from a motion of a non-rigid body like a human body, a rolling shutter distortion, and distortion of the optical system, etc. When a partial area other than a remarkable point deforms and moves with respect to the remarkable point in the template and the partial area includes a remarkable feature, the accuracy of the moving vector search deteriorates due to influence of the relative movement, i.e., competition of parallax. Moreover, the larger the template size is, the larger the influence of the distortion and deformation is, which deteriorates the accuracy.

In order to maintain the search possibility rate and the outlier rate while expanding the search range, the template size must be enlarged in many cases. In this case, the accuracy of a proper motion vector lowers due to influence of parallax of an object, modification of a moving body, a rolling shutter distortion, a distortion, etc.

Next, a search range control process in the image pickup apparatus 100 will be described.

The search range of the TM is set so as to sufficiently cover motions of main objects on an image between frames. Moreover, it becomes important to reduce circuit structure and computational complexity and to reduce the search range as much as possible. Accordingly, the image pickup apparatus equipped with the optical image stabilizing function shown in FIG. 1 sets the search range on the basis of motions of main objects on an image between frames while supposing the case where the optical image stabilization effect is fully exhibited.

Since the image pickup apparatus 100 performs the camera-work-determination control process and the edge-process-determination control process to obtain an image with a natural motion, the result of the image stabilization is not stabilized. Accordingly, when the search range is controlled in consideration of the camera-work-determination control process and the edge-process-determination control process, the efficiency of the motion vector search is improved.

The search range control process is repeatedly performed at every predetermined timing (for example, at every frame obtaining timing of 30 fps or 60 fps) as with the above-mentioned motion vector search process.

Figure 9:
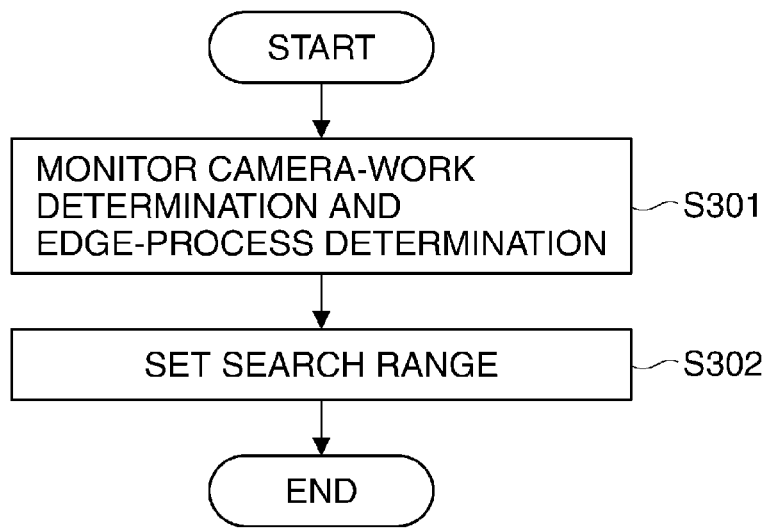
FIG. 9 is a flowchart showing a search range setting process executed by the image pickup apparatus in the first embodiment.

FIG. 9 is a flowchart showing the search range control process executed in the image pickup apparatus 100.

In step S301, the motion vector search unit 8 monitors the camera-work-determination control process and the edge-process-determination control process during an exposure period of the standard frame and reference frame that are used for the motion vector search. The timing of the motion vector search is dependent on the frame rate in many cases. On the other hand, the timings of the camera-work-determination control process and edge-process-determination control process are dependent on the detection timing of the shake information obtaining unit 3 with higher frequency in many cases. Accordingly, the camera-work-determination control process and edge-process-determination control process that are repeatedly performed during the exposure periods of the frames used for the motion vector search are monitored in the step S301. For example, a frame pickup period for computing a motion vector starts at exposure start time of a preceding frame and finishes at exposure end time of a subsequent frame. Then, when the camera-work-determination flag or the edge-process-determination flag is OFF in this frame pickup period, it is considered that the camera-work-determination control process or the edge-process-determination control process was OFF over the entire target period. On the contrary, when the camera-work-determination flag or the edge-process-determination flag is ON and the intensity level keeps a predetermined level in this frame pickup period, it is considered that the camera-work-determination control process or the edge-process-determination control process was ON and the intensity level was kept over the entire target period.

Although the certain timing in the frame exposure period is used as the sampling timing in this embodiment, the camera-work-determination control process and the edge-process-determination control process in the target period may be monitored at another timing that will be obtained by more complicated computation. Moreover, for example, the states of the camera-work-determination flag and edge-process-determination flag, and the average of the intensity level may be used as representative values in the period. As a matter of course, the camera-work-determination control process and the edge-process-determination control process may be monitored using complicated calculations, such as a weighted average.

In step S302, the motion vector search unit 8 sets the search range in the motion vector search between frames according to the states of the camera-work-determination control process and edge-process-determination control process in the target period that were monitored in the step S301. The details of this step S302 will be described with reference to FIG. 10.

Figure 10:
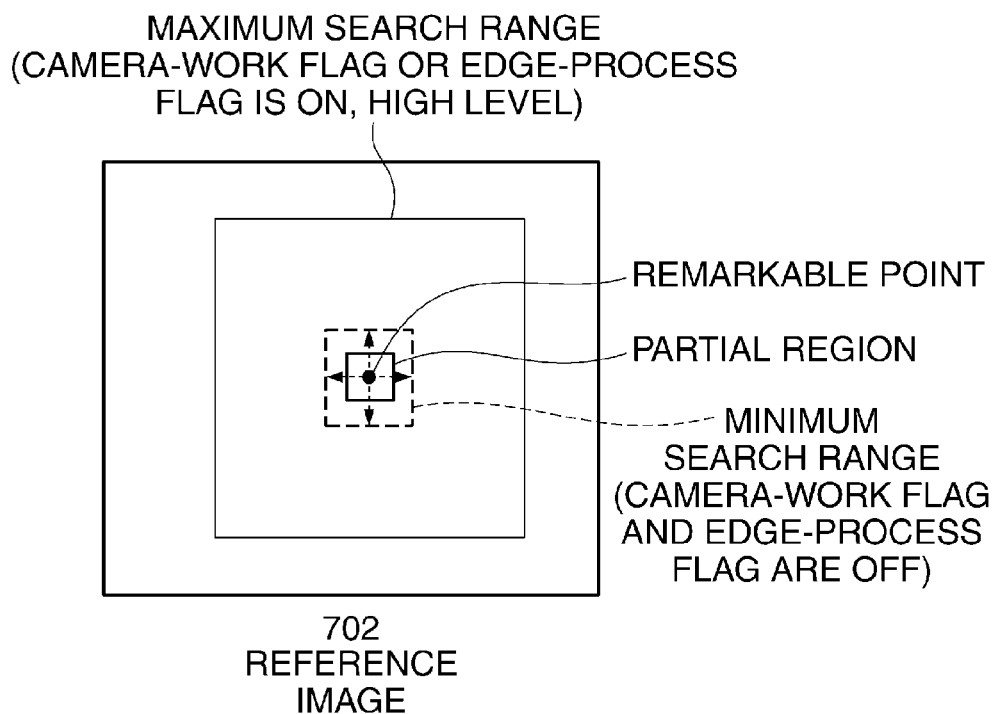
FIG. 10 is a view for describing a change of a search range set by the search range setting process shown in FIG. 9.

When the camera-work-determination control process and the edge-process-determination control process are OFF in the target period, the minimum search range is set to the optical image stabilization control unit 5 as shown in FIG. 10 in consideration of the optical image stabilization effect. On the other hand, when the camera-work-determination control process or the edge-process-determination control process is ON in the target period and at least one of their intensity levels is the maximum, the maximum search range is set to the optical image stabilization control unit 5 supposing image blur of the image pickup apparatus in the case where there is no optical image stabilization. Thus, the search range according to the state of the camera-work-determination control process, the state of the edge-process-determination control process, and their intensity levels are set to the optical image stabilization control unit 5.

When the camera-work-determination control process or the edge-process-determination control process is ON and the intensity levels are small, a suitable search range between the maximum search range and the minimum search range is set. For example, the search range is set depending on one of the camera-work-determination control process and the edge-process-determination control process of which the intensity level is higher.

The setting of the search range according to the states of the camera-work-determination control process and edge-process-determination control process enables to set a suitable search range for the motion vector search and to improve the property of the motion vector searching even under the condition where the optical image stabilization effect is not stabilized.

The above-mentioned embodiment postulates that an object is stationary. And therefore, it may not obtain a motion vector when an object is moving because the motion tends to exceed the assumed image motion. Since an application aiming at the camera shake correction is enough to obtain a deviation of an image motion, the image stabilization performance lowers because information that should be obtained is not obtained. In this case, when the number of the motion vectors becomes equal to or smaller than a preset threshold, the search range control is eased or released to set a wide search range. On the other hand, when the number of the motion vectors exceeds the threshold, the search range is narrowed. This improves the motion vector search performance without producing bad influence.

Conversely, when the motion vector search aims at the image stabilization, a motion vector that is a relative motion of an image computed from a moving object is unnecessary. In this case, a search range is set up according to the states of the camera-work-determination control process and edge-process-determination control process regardless of the number of motion vectors.

Figure 11A:
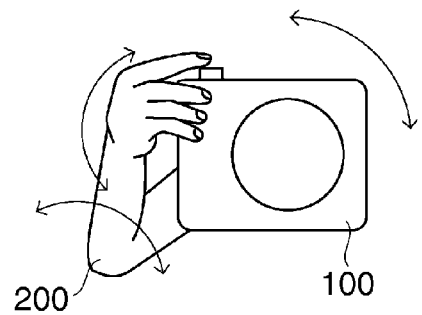
FIG. 11A through FIG. 11E are views for describing a setting of the search range to roll rotation blur.
Figure 11B:
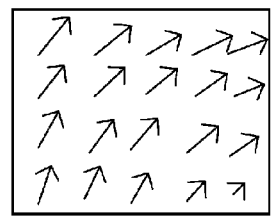

Moreover, the above-mentioned embodiment described the search range control together with the optical image stabilization. The optical image stabilization reduces the image motion in what is called Yaw and Pitch of which the rotation axes are perpendicular to the optical axis of the image pickup apparatus to rotation blur. Accordingly, it was described from a viewpoint of the search range control of the motion vector search to vertical and horizontal motions of an image caused by a motion of the image pickup apparatus. The present invention is applicable to a rotation within a plane of a Roll axis of which a rotation axis matches to the optical axis of the image pickup apparatus. For example, a handheld image pickup apparatus as shown in FIG. 11A causes a camera shake rotating with an elbow or wrist of a photographer as fulcrum. Accordingly, a rotational fulcrum exists outside the image as shown in FIG. 11B, and a complicated image motion of which the fulcrum always moves occurs between frames. Accordingly, it was hard to treat as a target of the search range restriction conventionally.

Figure 11C:
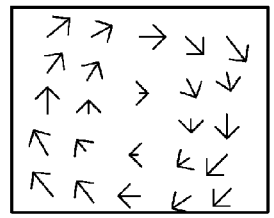
Figure 11D:
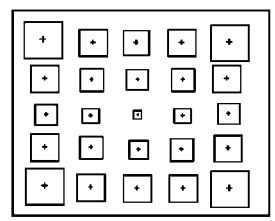

Accordingly, the image pickup apparatus that employs the optical image stabilization in this embodiment is able to remove a parallel moving component in the reminder of the image stabilization by making the optical image stabilization follow using a vector remainder as negative feedback and the moving-vector-search result indicating the horizontal-vertical motion of the image (for example, see Japanese Patent Publication No. 3610210). Accordingly, when the optical image stabilization is applied in the state small blur in the Yaw and Pitch directions as shown in FIG. 11C, it becomes possible to consider that only the component resulting from rotation of the image pickup apparatus around the optical axis remains on the images between the frames after the optical image stabilization. This motion depends on the rotation center on the image (i.e., the direction of the remarkable point from an image center), and the moving direction of the motion vector is determined. Then, the motions become point symmetry to the remarkable point around this image center. The moving amount is proportional to the distance between the image center and the remarkable point. In consideration of this relationship, a suitable search range that enables to obtain a motion vector can be set by setting a search range of which the size is proportional to the distance between the image center and the remarkable point about the rotation within the field as shown in FIG. 11D. Otherwise, as shown in FIG. 11E, a search range may be set by supposing the distance from the image center to the remarkable point in the farthest periphery, and the search range of the same size that allows to search for the motion vectors at all the remarkable points may be set.

Figure 11E:
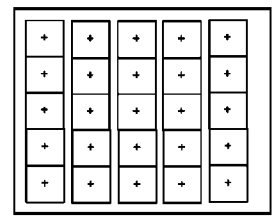

Moreover, FIG. 11D and FIG. 11E show the examples that set the search ranges symmetrical with the remarkable points. An asymmetrical search range according to the rotation direction in consideration of the positional relationship between the image center and the remarkable point may be set. In addition, it becomes valid to control the search range additionally according to magnitude of the position-posture change detected with the shake information obtaining unit 3 (for example, a gyro sensor about rotation) that is set to a rotation axis coaxial to the optical axis. Specifically, when the rotation amount around the optical axis is small, the search range is reduced. On the other hand, when the rotation amount around the optical axis is large, the search range is expanded.

However, when the rotation around the axes perpendicular to the optical axis of the image pickup apparatus (the rotation due to blur in what is called Yaw and Pitch) become large and the camera-work-determination control process and edge-process-determination control process are in an operating state, the blur occurs on the images between frames while the rotation center of the rotation within the field moves. Since the influence die to the blur of the rotation center is considered by setting the search range according to the existence of the operations of the camera-work-determination control process and edge-process-determination control process as mentioned above, the suitable search range control according to the performance change of the optical image stabilization becomes possible even for the change of rotation around the optical axis. It should be noted that the above-mentioned search range control about the Roll axis is additively executable with the search range controls about the Yaw and Pitch axes mentioned above.

Next, an image processing apparatus according to a second embodiment of the present invention will be described.

Figure 12:
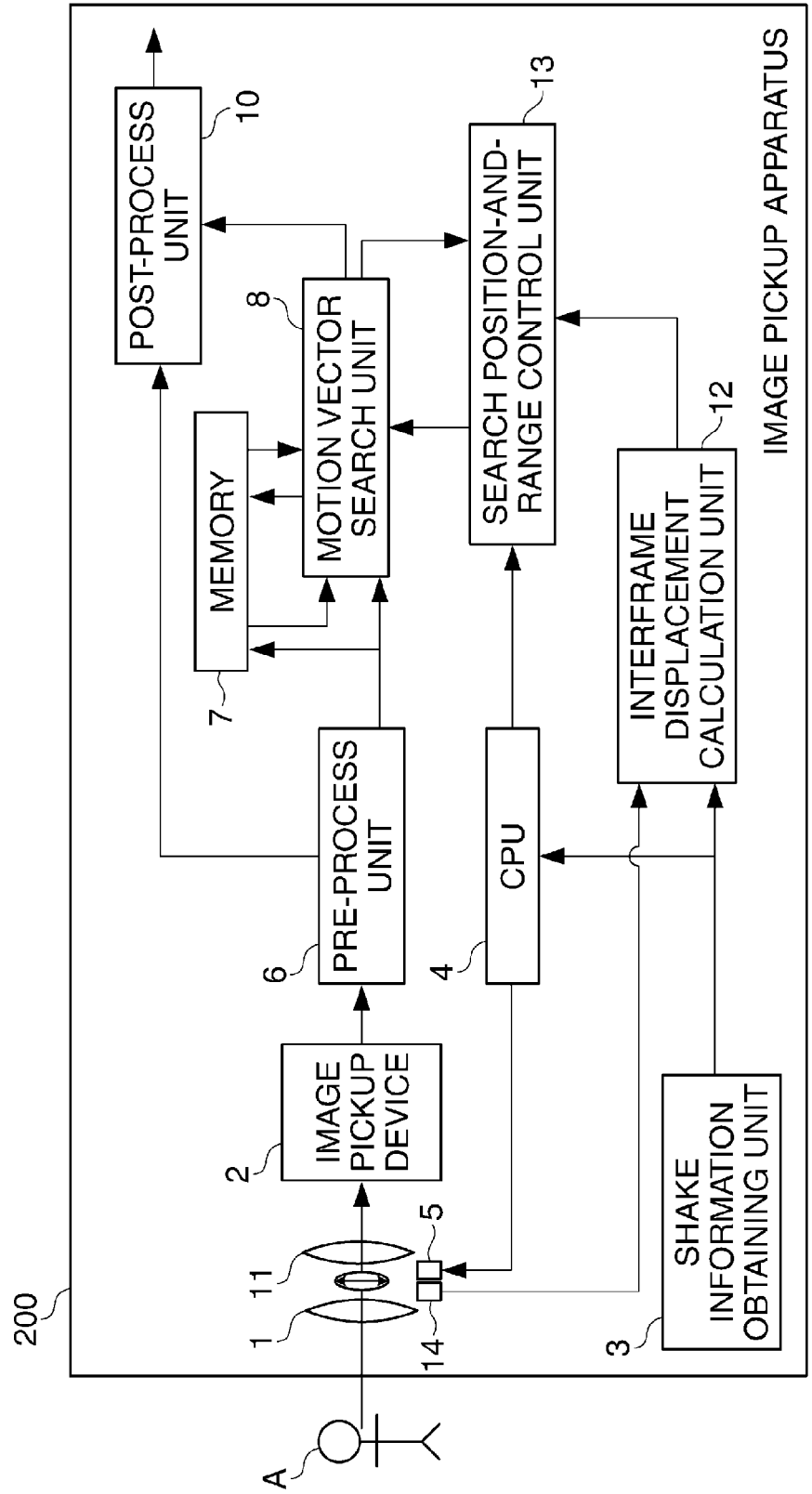
FIG. 12 is a block diagram schematically showing a configuration of an image pickup apparatus according to a second embodiment of the present invention.

FIG. 12 is a block diagram schematically showing a configuration of the image pickup apparatus according to the second embodiment of the present invention. It should be noted that the reference number is attached to the same component as that of the image pickup apparatus 100 shown in FIG. 1, and its description is omitted.

As shown in FIG. 12, the image pickup apparatus 200 is provided with the optical system 1, the image pickup device 2, the shake information obtaining unit 3, the CPU 4, the optical image stabilization control unit 5, the pre-process unit 6, the memory 7, the motion vector search unit 8, the post-process unit 10, a correction member 11, and an interframe displacement calculation unit 12. Furthermore, a search position-and-range control unit 13 and an optical image stabilization position detecting unit 14 are provided.

The optical image stabilization position detecting unit 14 is constituted by a Hall element or an encoder, etc., and measures correctly a parallel moving amount of a lens that performs the optical image stabilization. In the type where the image stabilization mechanism drives the image pickup device 2, the optical image stabilizations position detecting unit 14 is constituted by an encoder etc. that is installed in an actuator (not shown) of the image pickup device 2. Moreover, in the case of the electronic image stabilization mechanism, the optical image stabilization position detecting unit 14 detects an image stabilization position using control information read from the image pickup device 2.

Moreover, the optical image stabilization position detecting unit 14 is able to receive control information transmitted to the optical image stabilization control unit 5 from the CPU 4.

The interframe displacement calculation unit 12 integrates the position-posture change information output from the shake information obtaining unit 3 in synchronization with frames from the image pickup device 2, and finds position-posture displacement information between frames. Although the interframe displacement calculation unit 12 is mounted independently, it may be one function of the CPU 4 that reads and executes a control program from a memory (not shown) to control an operation of each part.

The search position-and-range control unit 13 controls expansion/reduction of the search range described in the above-mentioned first embodiment. In addition, the search position-and-range control unit 13 computes image blur forecasting information on the basis of the blur information from the shake information obtaining unit 3 and the optical-image-stabilization control information from the optical image stabilization position detecting unit 14, and additionally controls the position of the search center coordinate on the reference image to the remarkable point on the standard image in the motion vector search unit 8. Furthermore, the search position-and-range control unit 13 performs control to narrow the search range.

Figure 13:
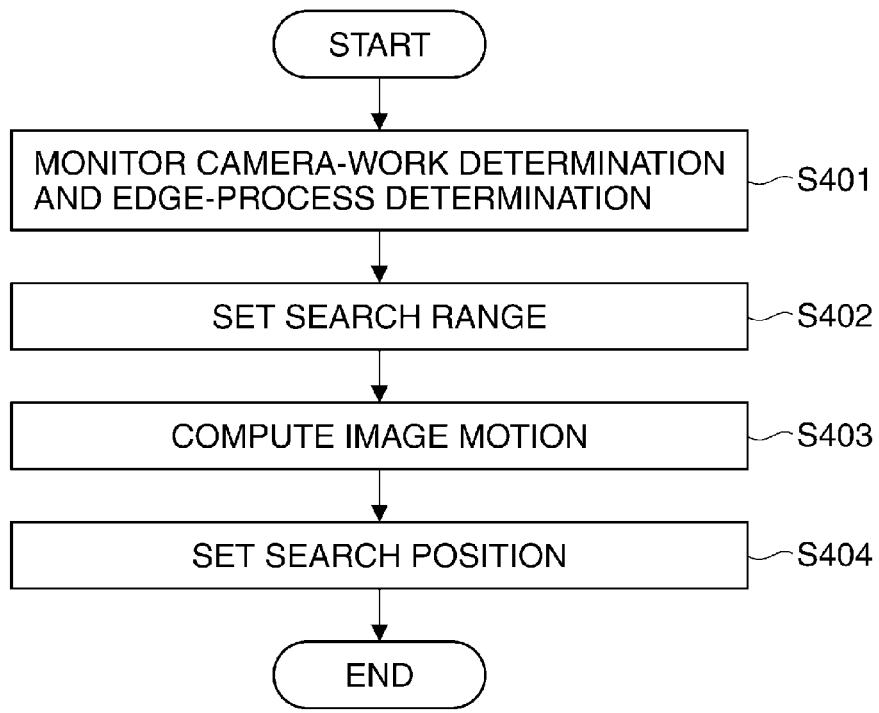
FIG. 13 is a flowchart showing a search position-and-range setting process executed by the image pickup apparatus in the second embodiment.

FIG. 13 is a flowchart showing a search position-and-range control process executed in the image pickup apparatus 100. It should be noted that this process is repeatedly performed at every predetermined timing (for example, at every frame obtaining timing of 30 fps or 60 fps) as with the above-mentioned motion vector search process.

In step S401, the motion vector search unit 8 monitors the camera-work-determination control process and edge-process-determination control process in the same manner as the step S301 in FIG. 9.

In step S402, the motion vector search unit 8 sets the search-range in the same manner as the step S302 in FIG. 9. Since a motion of an image that should be supported by the search position control becomes smaller, the search range set in the step S402 can be smaller than the search range set in the step S302 in FIG. 9.

In step S403, the search position-and-range control unit 13 computes the center-coordinate position of the search range. Specifically, the interframe displacement calculation unit 12 integrates the position-posture change information from the shake information obtaining unit 3, and finds the position-posture displacement information between frames. Accordingly, the shake of the image pickup apparatus before considering the optical image stabilization is computable.

Next, positions of the lens that performs the optical image stabilization at the times when the target frames used for the motion vector search of parallel motions are exposed are detected from the optical image stabilization position detecting unit 14. For example, a position at the timing when a pixel row at a central image height of an exposure frame is exposed is detected. Then, the position change of the correction member 11 of the optical image stabilization between frames is computed. The position change indicates the optical image stabilization effect between the frames. Then, the difference of the optical image stabilization effect between the frames from the shake of the image pickup apparatus before considering the optical image stabilization is considered as an average deviation position of a remarkable point due to blur on an image.

In the case where the position-posture change and the optical image stabilization effect are related to the angular shake of the image pickup apparatus ($\theta_{1\_x}$: Position-posture change, $\theta_{2\_x}$: Optical image stabilization effect, X: Yaw, Pitch, Roll), they are converted into displacement on the image using the focal length f of the optical system and a pixel pitch size $\Delta$cell. The following formula 6 aims to move a search center position. Supposing that a coordinate (x, y) is a search center coordinate on the reference image corresponding to the remarkable point on the standard image, a coordinate (x', y') becomes a post-control search center coordinate. Coefficients $\Delta x$ and $\Delta y$ indicate motion adjustment amounts about the center coordinate of the search range that is computed based on the image motion.

$$x' = x + f \tan(\theta_{1\_Y} - \theta_{2\_Y})/\Delta\text{cell} = x + \Delta x$$

$$y' = y + f \tan(\theta_{1\_P} - \theta_{2\_P})/\Delta\text{cell} = y + \Delta y \quad \text{[Formula 6]}$$

Moreover, a motion of the image pickup apparatus 200 in the Roll direction is also calculable according to the same concept. The control of the search position about the Roll rotation of the image pickup apparatus 200 is dependent on only a Roll rotation amount $\theta_{1\_R}$ of the image pickup apparatus without being affected by the optical image stabilization.

$$x_r' = (x - x_C)\cos(\theta_{1\_R}) - (y - y_C)\sin(\theta_{1\_R}) + x_C$$

$$y_r' = (x - x_C)\sin(\theta_{1\_R}) + (y - y_C)\cos(\theta_{1\_R}) + y_C \quad \text{[Formula 7]}$$

The coordinate (x', y') becomes the search center coordinate after the search position control in consideration of the effect of the Roll rotation of the image pickup apparatus. A coordinate (xc, yc) is an image center coordinate.

Influences of deviations in the Yaw, Pitch, and Roll directions are additively computable.

$$x_{all}' = x_r' + \Delta x$$

$$y_{all}' = y_r' + \Delta y \quad \text{[Formula 8]}$$

In step S404, the search position-and-range control unit 13 sets the search position in the motion vector search. The search range is moved by the average deviation amount of the remarkable point due to blur on the image that is computed in the step S403. This enables to set the search range that is further reduced.

Figure 14:
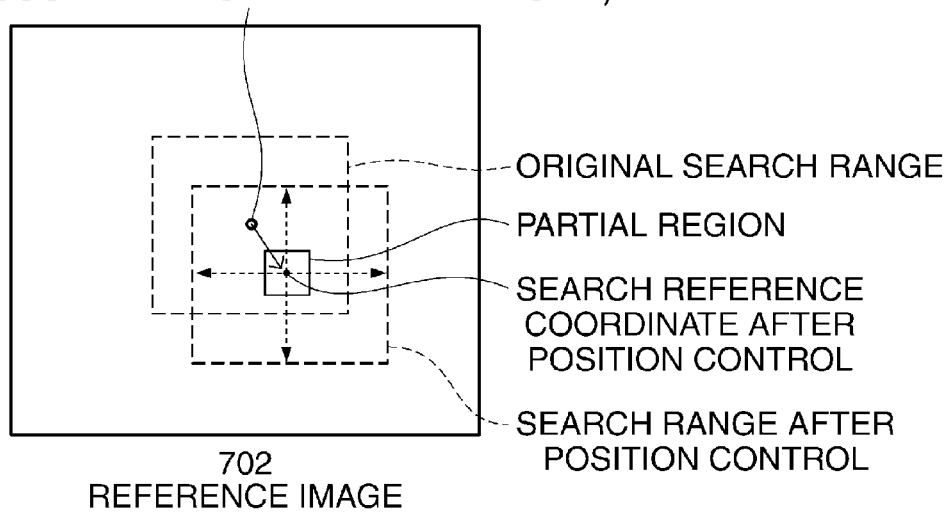
FIG. 14 is a view for describing change of a search reference coordinate set by the search position-and-range setting process shown in FIG. 13.

FIG. 14 is a view for describing change of a search reference coordinate set by the above-mentioned search position-and-range setting process.

As shown in FIG. 14, the search range is set by moving the reference coordinate of the search range on the basis of the position-posture change information from the shake information obtaining unit 3. As a result, the size of the search range set in the step S402 in FIG. 13 becomes smaller than the size of the search range in the above-mentioned first embodiment. Simultaneously, a motion vector calculation performance is improved by performing the search range control mentioned above according to the state of the optical image stabilization.

The control of the search position mentioned above compensates the difference between the camera shake that actually occurs in the image pickup apparatus and the optical image stabilization effect. When a view is changed, the search range control on the basis of the amount of the absolute value of the difference between the camera shake and the optical image stabilization effect enables to set the search range with higher accuracy and suitably rather than the search range control corresponding to the states of the camera-work-determination control process and edge-process-determination control process. Accordingly, the difference between the camera shake and the optical image stabilization effect may be input in the step S301 in FIG. 9. In that case, the search range is set on the basis of the amount of the absolute value of the difference in the same manner as the calculation of the search range on the basis of the states of the camera-work-determination flag and edge-process-determination flag and the intensity level.

Figure 15:
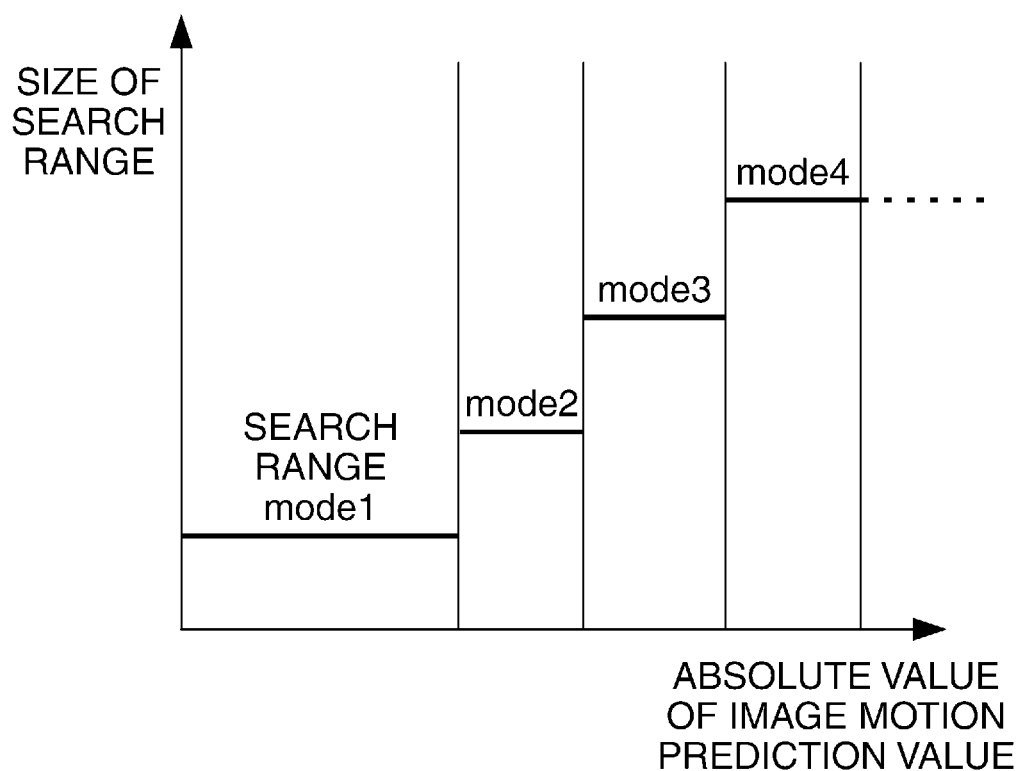
FIG. 15 is a view showing an example of a relation between a search range size and an absolute value of an image motion prediction value.

FIG. 15 is a view showing an example of a relation between a search range size and an absolute value of an image motion prediction value.

The difference between the camera shake and the optical image stabilization effect can be a predictor of an image motion. A residual difference between the shake occurred in the image pickup apparatus and the optical image stabilization effect will be referred to as an image motion prediction value. In the range where the absolute value of the image motion prediction value is small, the minimum search range supposing the optical image stabilization effect is set. This is set to "mode1" in the drawing. On the contrary, when the absolute value of the image motion prediction value exceeds the maximum range of the setting level, the maximum search range (for example, mode4) is set while supposing the shake of the image pickup apparatus in the case of having no optical image stabilization, for example. When the absolute value of the image motion prediction value is a middle value, the search range of the medium size, such as mode2 or mode3, is computed and set on the basis of the level set suitably. The number of the modes and the switching method of the mode according to the absolute value of the image motion prediction value may be set up suitably.

The above-mentioned search position-and-range control process is premised on a stationary object. Therefore, when there is a large difference between the image motion prediction value and the motion vector value computed, there is possibility of a moving object instead of a stationary object. Since an application aiming at the camera shake correction is enough to obtain an image motion, the image stabilization performance lowers because information that should be obtained is not obtained. In this case, when the deviation between the image motion prediction value, which is obtained from the difference between the camera shake occurred in the image pickup apparatus and the optical image stabilization effect, and the value of the motion vector obtained by the motion vector search is large, the search range control is eased or released and the wide range is searched. Then, when the number of the motion vectors is recovered, the search range is narrowed. This improves the motion vector search performance without producing bad influence. Since the deviation of the vectors is represented by a vector quantity, it can be quantified by finding a similarity score by projecting the vectors, for example. For example, when a similarity score is set to a, the standard of deviation is obtained by the following formula. Furthermore, the similarity score a falls within a range of 0-1 by normalizing. It should be noted that the vector "a" is an image motion prediction vector, and the vector "b" is a calculated motion vector.

$$\alpha = \frac{\vec{a} \cdot \vec{b}}{|\vec{a}||\vec{b}|}$$ [Formula 9]

The above-mentioned embodiments described that the position-posture displacement information described as the angular displacement information, for example, is obtained by integrating the position-posture change information. However, the position-posture displacement information may be directly found using an azimuth meter achieved by GPS etc., an inclination sensor, or an earth magnetism meter.

Moreover, the above-mentioned embodiments described the examples that apply the present invention to the lens integrated digital still camera or the lens integrated video camera. However, the present invention is applicable to a lens-interchangeable camera that consists of an interchangeable lens and a camera body. In this case, the interchangeable lens that includes the lens as the correction member 11 and the image processing apparatus for the image stabilization process, and the camera body that includes the image processing apparatus for the image stabilization process are included in the scope of the present invention.

Although the embodiments of the invention have been described, the present invention is not limited to the above-mentioned embodiments, the present invention includes various modifications as long as the concept of the invention is not deviated. Parts of the above-mentioned embodiments may be combined suitably.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-169385, filed Aug. 22, 2014, which is hereby incorporated by reference herein in its entirety.

What is claimed is:

1. An image processing apparatus comprising:
at least one processor which executes a program stored in a memory, wherein the at least one processor functions as a motion vector search unit and a control unit, and wherein
the motion vector search unit is configured to search for a motion vector of a reference image later input with respect to a standard image input previously; and
the control unit is configured to change, based on position-posture change information about an image pickup apparatus and image stabilization control information, at least one of a search range and a search position of a motion vector searched by said motion vector search unit.

2. The image processing apparatus according to claim 1, wherein the at least one processor further functions as:
a camera-work-determination unit configured to determine whether a camera work exists based on the position-posture change information, an edge-process-determination unit configured to determine whether an edge process is necessary based on the position-posture change information, and an image-stabilization-control-information generation unit configured to generate image stabilization control information including determination results and intensity levels of said camera-work-determination unit and edge-process-determination unit, and wherein said control unit expands the search range according to at least one of the intensity levels, when it is determined that at least one of the camera work and edge process is necessary based on the image stabilization control information.

3. An image processing apparatus comprising:

a motion vector search unit configured to search for a motion vector of a reference image later input with respect to a standard image input previously; and a control unit configured to receive position-posture change information about an image pickup apparatus detected by a rotation sensor that is attached to a rotation axis coaxial to an optical axis of the image pickup apparatus, to expand a search range for a motion vector by said motion vector search unit when a rotation amount around the rotation axis is larger than a predetermined value, and to reduce the search range when the rotation amount around the rotation axis is smaller than the predetermined value.

4. The image processing apparatus according to claim 1, wherein said control unit sets a wide search range by easing or releasing the control of the search range when the number of the motion vectors becomes equal to or smaller than a preset threshold, and narrows the search range when the number of the motion vectors exceeds the threshold.

5. The image processing apparatus according to claim 1, wherein said control unit reduces the search range when position-posture displacement information that is found by integrating the position-posture change information and a difference of change in an image stabilization position detected with an image stabilization position detection unit are small, and expands the search range when the position-posture displacement information and the difference are large.

6. The image processing apparatus according to claim 5, wherein said control unit sets a wide search range by easing or releasing the control of the search range when a deviation between an image motion prediction value obtained from the position-posture displacement information and the difference of change in the image stabilization position, and a value of the motion vector detected with said motion vector search unit is large, and narrows the search range when the deviation is small.

7. A control method for an image processing apparatus, the control method comprising:

a motion vector search step of searching for a motion vector of a reference image later input with respect to a standard image input previously; and a control step of changing, based on position-posture change information about an image pickup apparatus and image stabilization control information, at least one of a search range and a search position of a motion vector searched in said motion vector search step.

8. A non-transitory computer-readable storage medium storing a control program causing a computer to execute a control method for an image processing apparatus, the control method comprising:

a motion vector search step of searching for a motion vector of a reference image later input with respect to a standard image input previously; and a control step of changing, based on position-posture change information about an image pickup apparatus and image stabilization control information, at least one of a search range and a search position of a motion vector searched in said motion vector search step.

9. An image pickup apparatus comprising:

an image pickup device;

at least one processor which executes a program stored in a memory, wherein the at least one processor functions as an image stabilization unit, a motion vector search unit, a detection unit and a control unit, and wherein:

the motion vector search unit is configured to search for a motion vector of a reference image later input from said image pickup device with respect to a standard image input previously;

the detection unit is configured to detect position-posture change information about an image pickup apparatus;

the control unit is configured to change, based on the position-posture change information detected by said detection unit and image stabilization control information obtained from said image stabilizing unit, set at least one of a search range and a search position of a motion vector searched by said motion vector search unit.

10. An image pickup apparatus comprising:

an image stabilization unit;

an image pickup device;

a motion vector search unit configured to search for a motion vector of a reference image later input from said image pickup device with respect to a standard image input previously;

a rotation sensor that is attached to a rotation axis coaxial to an optical axis of the image pickup apparatus; and a control unit configured to receive position-posture change information about the image pickup apparatus detected by said rotation sensor, to expand a search range for a motion vector by said motion vector search unit when a rotation amount around the rotation axis is larger than a predetermined value, and to reduce the search range when the rotation amount around the rotation axis is smaller than the predetermined value.

* * * * *